United States Patent [19]

Starcevic

[11] 4,275,936

[45] Jun. 30, 1981

[54] SEGMENT BEARING IN LARGE ROTARY MACHINES

[75] Inventor: Mihailo Starcevic, Mellingen, Switzerland

[73] Assignee: BBC Brown, Boveri & Company, Limited, Baden, Switzerland

[21] Appl. No.: 24,270

[22] Filed: Mar. 27, 1979

[30] Foreign Application Priority Data

Mar. 29, 1978 [CH] Switzerland .................. 3329/78

[51] Int. Cl.³ .................. F16C 17/03; F16C 17/06
[52] U.S. Cl. .................. 308/73; 308/15; 308/160
[58] Field of Search .................. 308/15, 73, DIG. 14, 308/2 R, 2 A, 26, 37, 160

[56] References Cited

U.S. PATENT DOCUMENTS

| 3,784,265 | 1/1974 | Cornford | 308/73 |
| 4,141,605 | 2/1979 | Riordan et al. | 308/73 |
| 4,149,759 | 4/1979 | Miller | 308/15 |

Primary Examiner—Lenard A. Footland
Attorney, Agent, or Firm—Burns, Doane, Swecker & Mathis

[57] ABSTRACT

Segment bearings for use in large rotating machines utilize support elements in the forms of pins, pipes or the like. These support elements are arranged between a friction bearing segment and a supporting segment and are constructed with varying compressive strengths. The variation of compressive strength is selected such that a parallel shift of the bearing surface occurs during loading of the friction bearing segments.

11 Claims, 11 Drawing Figures

SEGMENT BEARING IN LARGE ROTARY MACHINES

BACKGROUND OF THE INVENTION

The present relates generally to bearings. More particularly, the present invention concerns segmental bearings of the type used with a rotating machine of substantial size.

Stringent requirements are placed on shaft bearings of power plant turbosets and power plant generators as a result of the great rotating weight associated with rotors, shafts and the components supported thereby. By virtue of the high static and dynamic force loads and the external effects generated by the working medium, these shafts bearings are subjected to high specific bearing surface compressions (20–60 bar) and journal circumferential velocities which substantially exceed 100 m/sec.

A hydrodynamic bearing is used exclusively for supporting such shafts has proven to be thoroughly satisfactory for the operating conditions. In addition, the hydrodynamic bearing has attained a high state of development. With a hydrodynamic bearing it is possible to produce a sufficiently thick lubricating film by self-lubrication. The required thickness for such a lubricating film is determined by the magnitude of the deflection under load that is experienced by the guide block in the case of an axial bearing such as used in a hydroelectric generator or by deflection of a bearing box segment in a radial bearing of a power plant turboset. In these hydrodynamic bearings, deflection of the bearing surface of the guide block on bearing box segment is caused by hydrostatic pressure in the oil lubricant film created during rotation of the shaft. Such an hydrostatic pressure acts as a stress nonuniformly distributed over the entire bearing surface with the stress decreasing toward the edges of the respective guide block or bearing box segment and causes a bending to occur in the bearing surface.

This mechanical deflection caused by hydrostatic pressure has superimposed thereon deflections which result from the heating of the guide block or bearing box segments and the associated supporting elements. It is to be understood that supporting plates are exposed to this thermally-induced deflection in the case of axial bearings whereas supporting segments are exposed to the thermally-induced deflection in the case of radial bearings.

In order to avoid removal of the lubricant film and subsequent metallic contact of the bearing surfaces, sometimes referred to as mixed friction, the thickness of the lubricating film which occurs during operation must always be greater than the resulting deflection produced by the combined stresses: i.e., induced by the hydrostatic pressure and the thermally induced deflection. It is only when such a thickness condition is satisfied that the bearing surface and the cooperating shaft surface will remain separated from one another by the lubricating film. Without such separation, damage can occur which can eventially lead to destruction of bearing surface and adjacent shaft.

One object of the present invention consists of providing a bearing of the type suitable for use with large rotating machines in which the bearing surfaces deflect in such a manner that the bearing surface remains essentially planar and moves essentially parallel to the original undeflected position. These deflections are caused by the mechanical and thermal stresses noted above. Moreover, it is an object of the present invention to confine the geometrical deviations of the deflected bearing surfaces so that those deviations lie within very narrow limits from their unstressed configuration and so that the deviations are less than the lubricating film thicknesses conventionally occurring during operation. Accordingly, liquid friction is guaranteed under all operating conditions.

DESCRIPTION OF THE DRAWINGS

The above and many other objects of the present invention will be apparent to those skilled in the art when this specification is read in conjunction with the drawings wherein like reference numerals have been applied to like elements and wherein.

DESCRIPTION OF THE PREFERRED EMBODIMENTS

Figure 1:
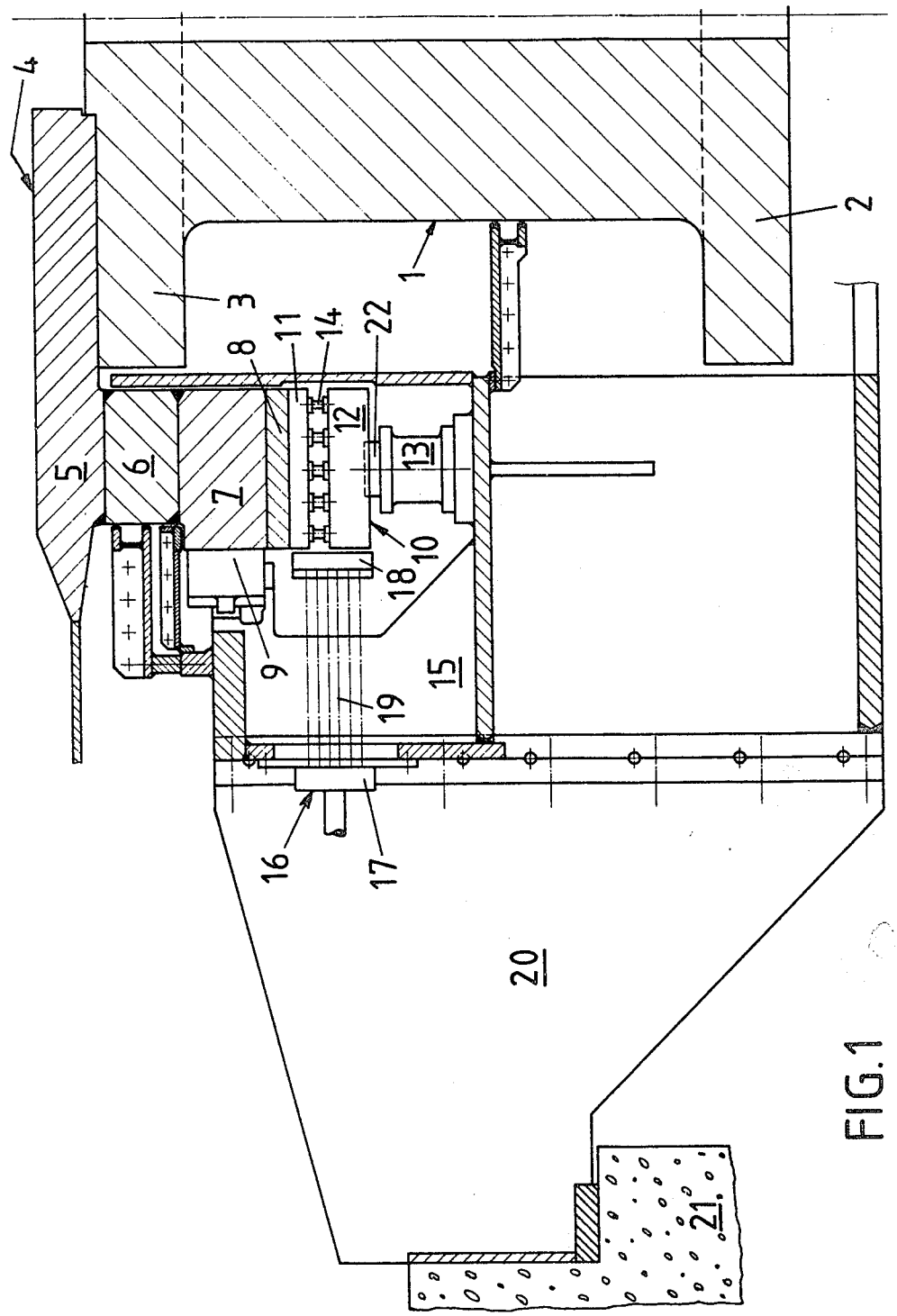
FIG. 1 is a partial cross-sectional view taken through the bearing structure of an hydroelectric generator.

The uppermost portion of a suspended shaft for a generator having a water turbine is illustrated in FIG. 1. The shaft 1 has two coupling flanges 2, 3. The lower flange 2 is connected to a water turbine shaft (not shown); whereas, the upper flange 3 is connected to a generator rotor (not shown). The generator rotor includes a wheel flange fastened to the lower end thereof. This wheel flange includes a collar disk 5, a spacer 6, a radial bearing ring 7 and a pivot bearing 8 and a radial bearing 9. The radial bearing ring 7 has a cylindrical bearing surface which cooperates with segments of the radial segment bearing, one bearing segment 9 of which is depicted in FIG. 1. The exposed lower front surface of the pivot bearing 8 defines a bearing surface which cooperates with an axial segment bearing 10 having a guide block or friction bearing member 11, a support plate or member 12, a setting spindle 13 and a plurality of support elements 14. These support elements 14 hold the guide block 11 above the support plate 12 which, in turn, is supported by the setting spindle 13. Moreover, the support elements 14 are distributed over a support area of the support plate 12.

A cooler 16 is provided in which water is used to cool the lubricating oil. Water passes through collecting chambers 17, 18 and an intermediate cooling coil 19 which is disposed within a bearing housing 15. Support ribs 20 are disposed circumferentially around the bearing housing 15 so as to define a star-shaped arrangement. These support ribs 20 support the bearing housing 15 and shaft 1 relative to a foundation 21.

Figure 2:
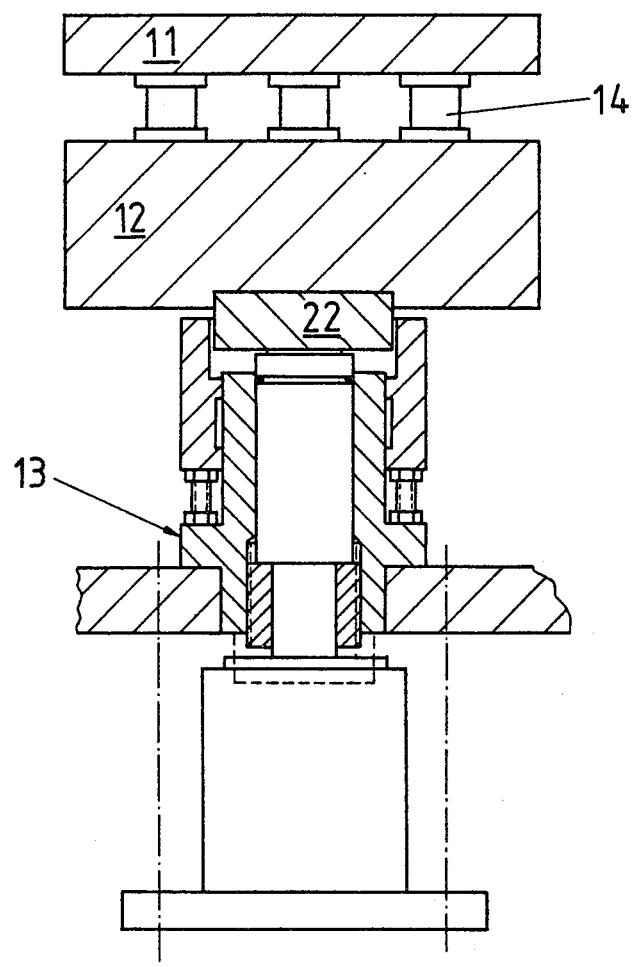
FIG. 2 is a partial cross-sectional view of an axial bearing segment with a guide block, supporting elements, support plate and setting spindle.

One of the axial bearing segment units is shown in greater detail in FIG. 2. Each axial segment unit includes the guide block 11 which cooperates with the pivot bearing 8 positioned thereabove, as well as a support plate 12 which may be inclined in any direction with respect a cambered pivot pin 22. The pivot pin 22 is located opposite the setting spindle 13. By permitting the wide range of angular inclinations which are possible for the support plate 12, the plate 12 can assume a position corresponding to the lubricating oil film formed between the pivot bearing 8 and the guide block 11 through support elements or pins 14 between the guide block 11 and the support plate 12.

Figure 3:
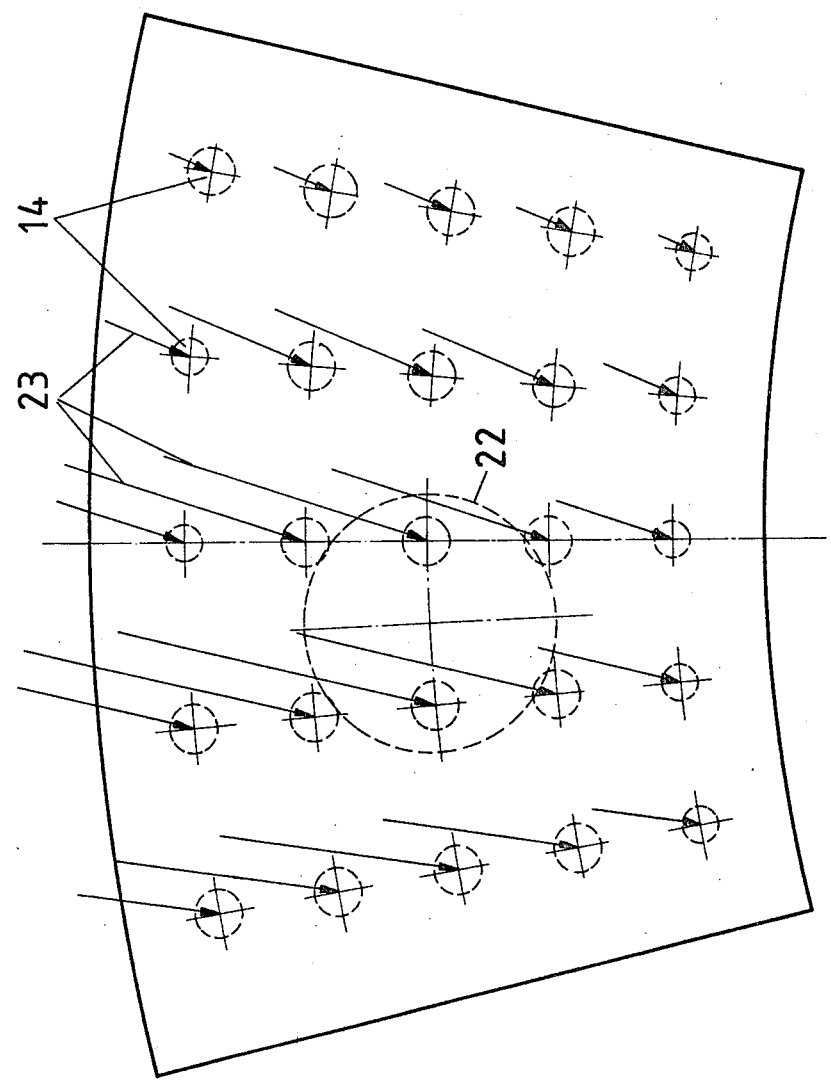
FIG. 3 is a plan view of a guide block which schematically illustrates the forces acting on the supporting elements.

The upper bearing surface of the guide block 11 is illustrated in FIG. 3 along with a schematic illustration of the support pins 14 for one guide block design. The position of the pivot pin 22 as well as positions of the supporting pins 14 are depicted by broken lines. Hydrodynamic pressure forces acting on the surface of the guide block 11 are graphically illustrated by the vector or arrows 23 and directed at the center point of each support pin cross-section. These pressure forces are generated by the lubricant film wedge that rises during rotation between the pivot ring (see FIG. 1) and the guide block 11. Hydrodynamic forces act essentially normal to the plane of the guide block bearing surface and their relative magnitude is illustrated in FIG. 3 by the variations in length of the vectors 23.

Figure 4:
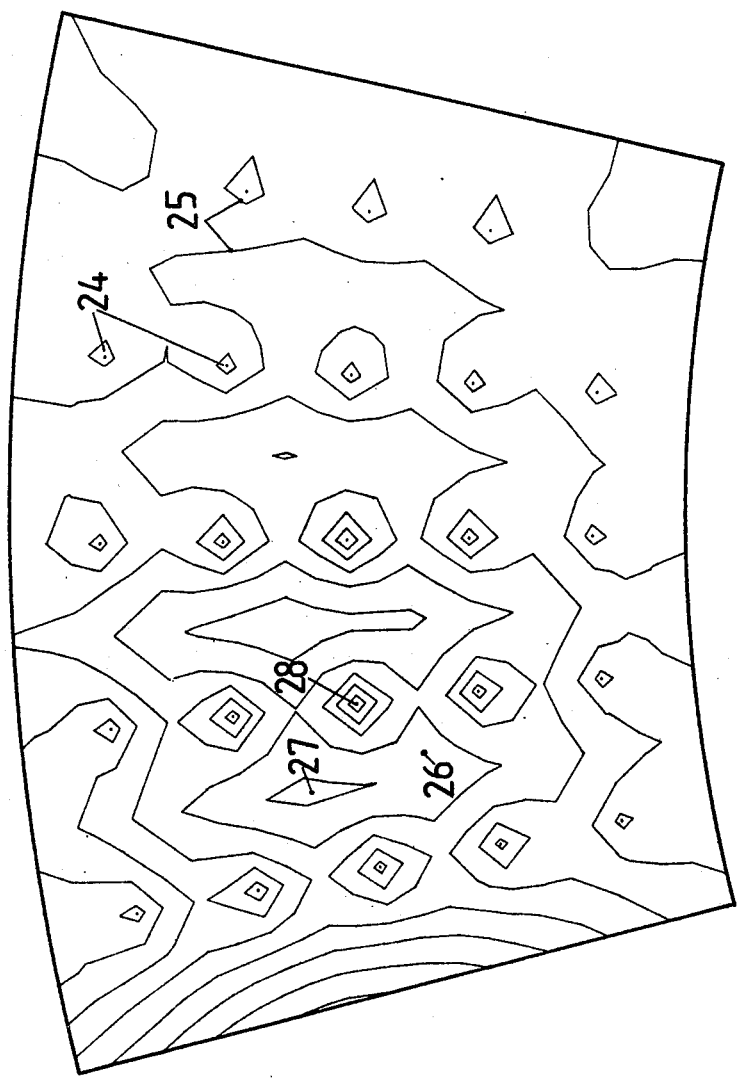
FIG. 4 is a graphic representation of the deflection field for a pressure load on a guide block such as illustrated in FIG. 3.

The strain or deflection pattern induced in the guide block 11 by the hydrodynamic pressure forces is illustrated by the contour lines shown in FIG. 4. In developing FIG. 4, it is assumed that the hydrostatic load defined in FIG. 3 has been applied to the surface to generate the deflection. Moreover, FIG. 4 assumes that the ends of the support pins 14 lie in a common plane. Instead of illustrating these support elements in FIG. 4, only the respective points 24 at which forces are applied to those pins are illustrated on the bearing surface of the guide block 11. The contour lines connect points of equal deflections, with the difference in deflection between adjacent contour lines 25 being two micrometers (microns). In accordance with the present invention, the support pins are dimensioned by taking into consideration the deflection of the guide plate 11 so that the upper portions of the support pins deflect simultaneously by the same amount when exposed to the pressure load illustrated in FIG. 3. In this manner, all supporting points in the loaded state remain in a common plane which shifts so as to remain parallel to the original unstressed location of that plane.

Deflection of any random point of the bearing plane or bearing surface relative to an adjacent support point 24 may be readily determined by counting the number of contour lines of equal deflection which pass between the random point and the particular support point. For example, the deflection of point 26 relative to the support point 28 amounts to $4 \times 2$ microns or 8 microns; whereas the deflection of point 27 is $5 \times 2$ $\mu$m (microns) or 10 $\mu$m (microns). These results are obtained since four contour lines of equal deflection pass between the support point 28 and the point 26 whereas 5 contour lines of uniform deflection pass between the support point 28 and the arbitrary point 27.

The support plate 12 which underlies the guide block 11 also undergoes deflection due to the applied hydrodynamic forces. These applied hydrodynamic forces are transmitted through the support pins 14 from the guide block 11 to the support plate 12.

Figure 5:
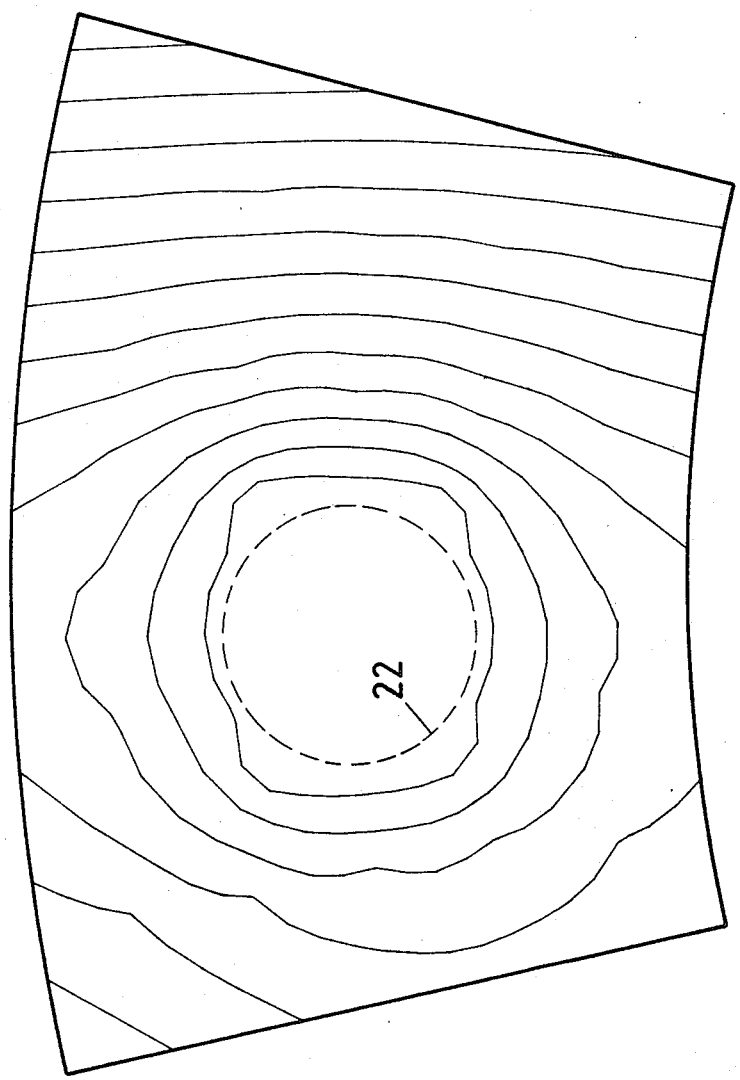
FIG. 5 is a plan view showing the deflection field that results on a support plate from pressure loading on the guide block as shown in FIG. 3.

In FIG. 5, the contour lines represent points on the support plate 12 having equal deflection. Since the support plate 12 is always supported by an eccentrically positioned pivot pin 22, bending deflection of the guide block 12 is much greater than the deflection in the guide block 11. The spacing between contour lines in FIG. 5 corresponds to a deflection of 5 $\mu$m (microns). Accordingly, it will be observed from FIG. 5 that the deflection at the edges 38 which are most remote from the pivot pin 22 amounts to a deflection of 60 $\mu$m (microns) in contrast to a maximum deflection of 10 $\mu$m (microns) which occurs in the guide block 11 (see FIG. 4).

Evaluation of the deflection fields or patterns for statistically indeterminate systems such as those illustrated in FIGS. 4 and 5 as well as the deflections which result from thermal stresses, and pressure resistances of the supporting elements can be quickly and efficiently obtained using an electronic computer having a program that employs the method of finite elements. Once the deflection fields and reaction forces are available for the guide block 11 and the support plate 12, the required rigidity of the individual support pins 14 can be determined subject to the condition that the deflection of all support points of the guide block 11 must be equal. It will be apparent that the assumption initially used (that the guide block surface always shifts parallel to itself so as to preserve its planeness) is satisfied by this condition.

Deflections of the support points are attributable to the deflection of the support plate 12 beneath the support pins 14 and the buckling strength of the support pins 14 when exposed to compressive forces. As the sum of these deflections must be equal for all support pins, the required rigidity (or compressive strength) of the support pins positioned at the most severely curved areas of the support plate 12 must be greater than the rigidity of those support pins positioned in the vicinity of the pivot pin 22. When using circularly cylindrical equal length elements, this condition infers that smaller diameter elements must be used in the vicinity of pivot pin 22 whereas larger diameter elements are necessary in locations remote from the pivot pin 22. It is this remote area of the support plate in which the primary portion of the deflection occurs on the support plates 12. At the pivot pin 22 deflection of the support plate 12 is equal to zero so that the entire pressure deflection is resisted at this location by a single support element which may be located in the area of the pivot pin 22.

Figure 6:
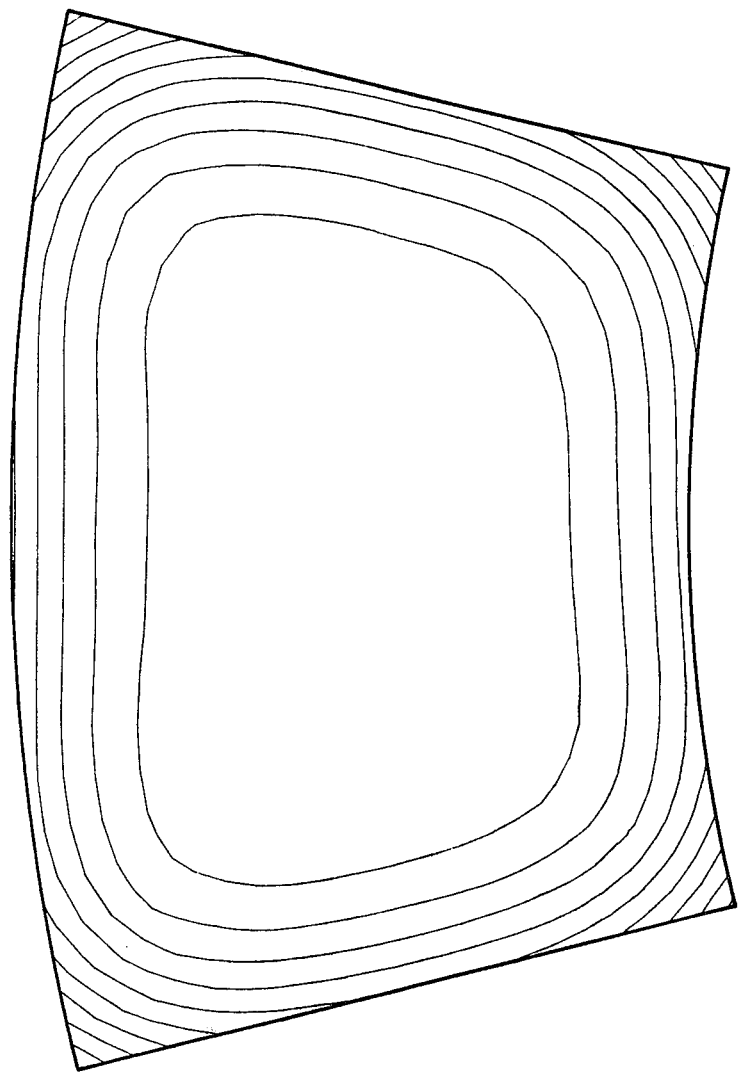
FIG. 6 is a schematic illustration of the deflection field associated with thermally induced stresses in a guide block such as illustrated in FIG. 3.

In addition to deflection of the guide block as a result of the hydrodynamic pressure loadings in the lubricating film, bearing friction heat also occurs during operation and causes a deflection of the surface. Bearing friction heat tends to heat up the material layer adjacent to the bearing surface relative to the rest of the guide block 11. This surface material layer therefore experiences the greatest thermally induced elongation and is, thereby, bent convexly. In FIG. 6, the contour lines represent thermally induced deflections, adjacent lines differing by 10 μm (microns). Thus, it is seen from FIG. 6 that the deflection at the corners 39 exceeds 50 μm (microns). However, since the support plate 12 always has more flexure resistance than the guide block 11, the support plate will compensate for deflections of the guide block 11 resulting from thermal expansion without thereby experiencing significant additional deflections itself.

Figure 7:
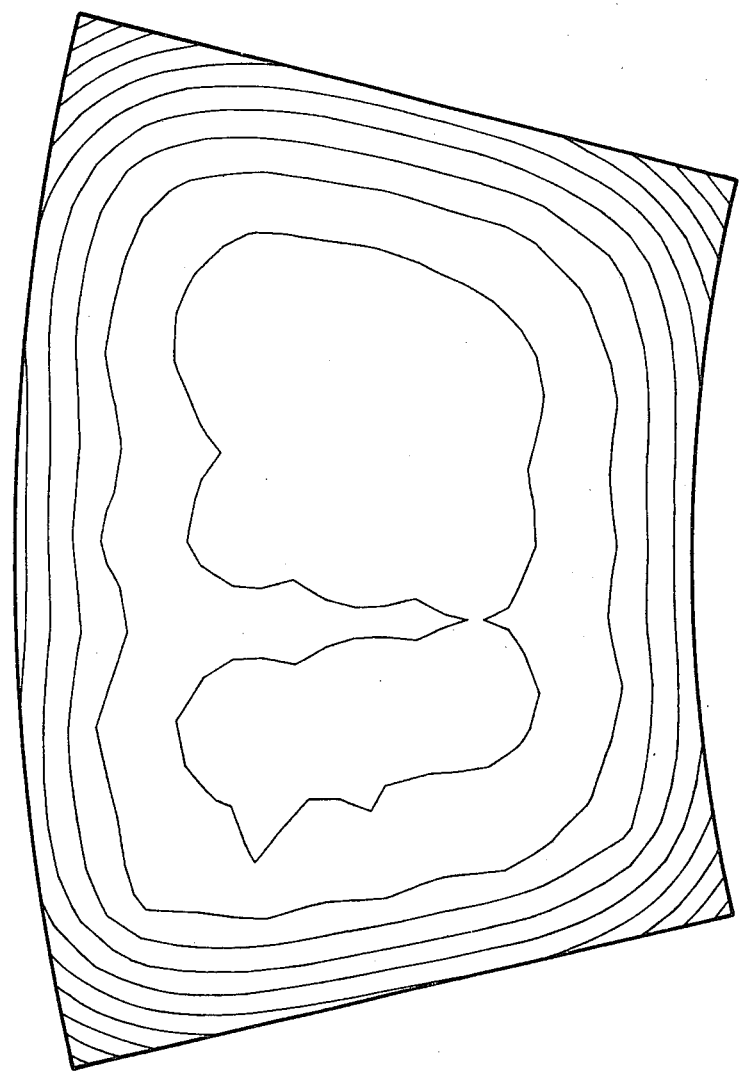
FIG. 7 is a schematic illustration of the deflection resulting from combined mechanical and thermally induced stresses on a support plate according to FIG. 3.

For example, if the support plate 12 is three times as thick as the guide block 11, the flexural resistance of the support plate 12 amounts to twenty seven times the flexural resistance of the guide block 11. This conclusion is based upon a recognition that the equatorial polar moment of inertia of a plane determative for flexural resistance increases with the third power of the cross-section height. Accordingly, deflections of the guide block 11 are reduced to 1/27 of their anticipated value. The combined deflection of the guide block 11 resulting from both the mechanical and thermal loading is illustrated by the contour lines in FIG. 7. From FIG. 7, the contour lines are spaced so as to represent deflections of 10 μm (microns) intervals. It can readily be seen that the deflection range stays within 20 μm (microns) throughout the preponderant portion of the guide block surface. Accordingly, a highly advantageous support profile can be generated or the guide block surface.

Figure 8:
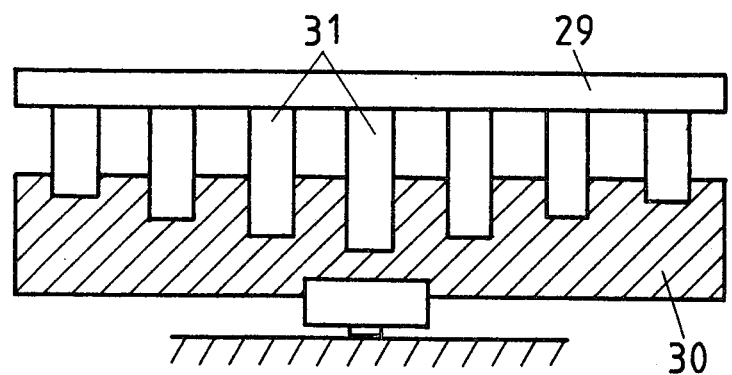
FIG. 8 is a schematic illustration of a bearing assembly in which uniform deflections are obtained by the use of variable length support elements.

One embodiment for an axial bearing segment using a guide block 29 and support plate 30 is illustrated in FIG. 8. The support elements 31 are generally cylindrical pins and are provided with a differing rigidity depending upon the relative location of the pin 31 in the bearing segment assembly. The pins 31 a uniform and common diameter. Accordingly, the differing structural rigidity is accomplished by varying the lengths of these support pins 31. As can be seen from FIG. 8, the longer bolts with lower rigidity are located in the center of the guide plate whereas the shorter more rigid pins are positioned in the peripheral portions.

Figure 9:
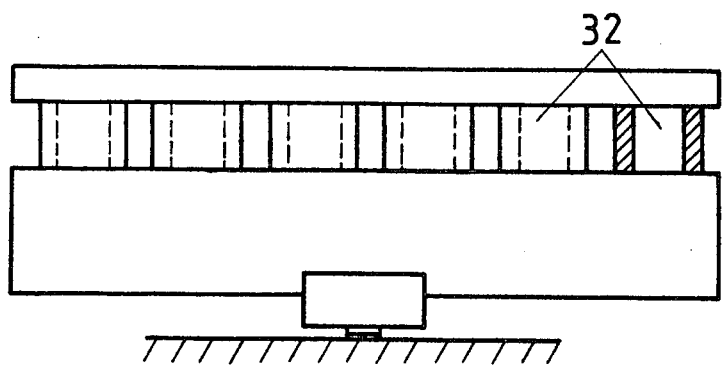
FIG. 9 is a schematic illustration of a bearing assembly wherein uniform deflection is attained by using support elements having walls of predetermined variable thickness.

Another embodiment of the support elements is illustrated in FIG. 9. The support elements 32 there include a plurality of pipes or annular members whose resistance to compressive deflection is varied by selecting an appropriate wall thickness.

Figure 10:
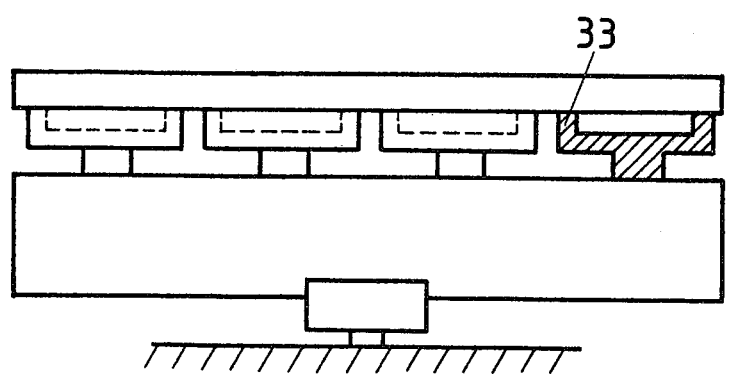
FIG. 10 is a schematic illustration of a bearing assembly which provides uniform deflection of the guide block by adjusting wall thickness of a disk-shaft support element.

Still another embodiment is illustrated in FIG. 10 where each supporting element is a disk-cylinder 33 having a columnar portion 40, an annular portion 41 concentric therewith and connected thereto by a generally radially extending web 42. By virtue of the construction of the disk-cylinders 33, both bending deflection and compressive deflection occur therein. Accordingly, compressive strength of the disk-cylinders can be varied by selecting different wall thickness for the annular portion 41, by selecting different diameters for the columnar portion 40, by selecting different wall thicknesses for the web portion 42, or any combination of these.

In addition to consideration of the support elements, the design of the guide plate and the support plate is also important. More specifically, the flexural strength of the support plate preferably exceeds the flexural strength of the guide plate by a factor of ten or more so that the support plate is stiff by comparison to the guide plate. Also, both the support member and the guide member should have a uniform thickness with the support plate thickness being at least two times the guide plate thickness. These relationships help keep the total deflections to be experienced by the bearing structure within a range that can be compensated by using support elements designed and distributed as discussed above.

Naturally, it also possible to have combinations of the measures described hereinabove for varying the compressive strength or rigidity of the support elements. Moreover, it is also possible to utilize concentrically arranged pipe elements with varying wall thicknesses, lengths, and the like. And, the support elements could be manufactured, for example, from a plurality of different materials each having a different modulus of elasticity so that the material of various support elements can be selected to yield the desired deflection characteristics.

Figure 11:
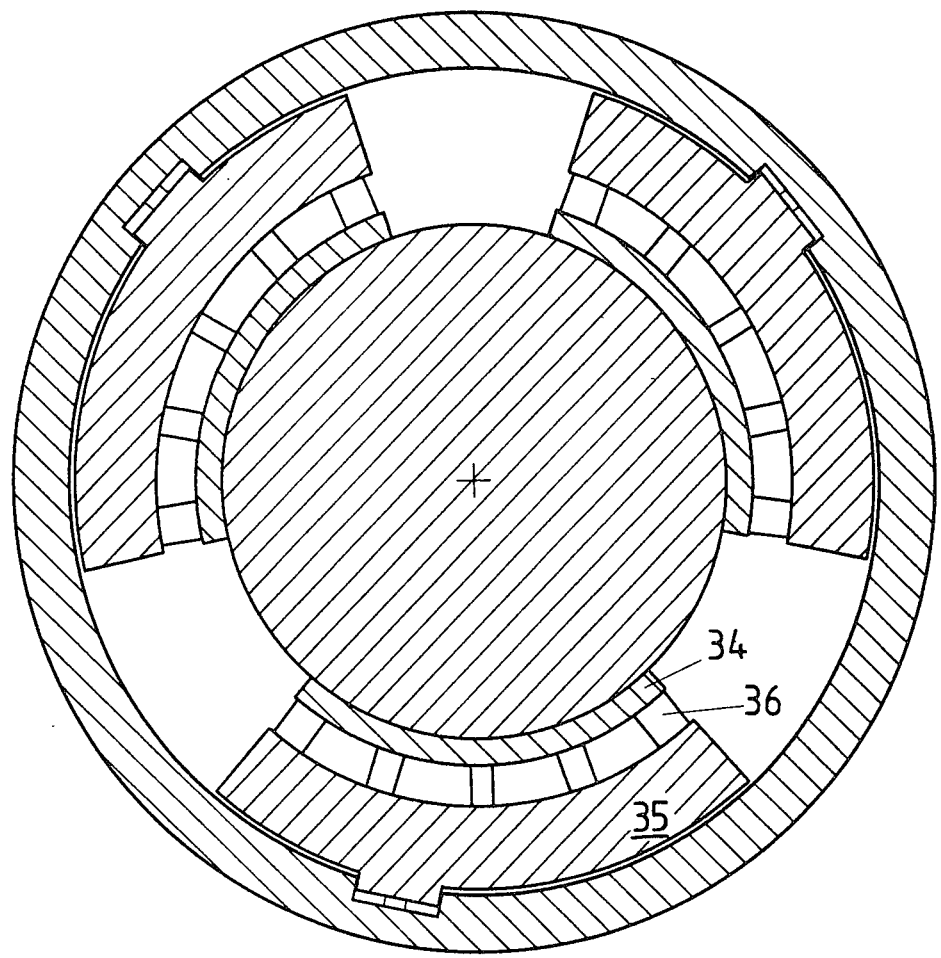
FIG. 11 is a schematic illustration of a radial segment bearing constructed according to the present invention.

When dealing radial segment bearings, such as illustrated in FIG. 11, the same universe of support element designs is also available. For example, FIG. 11 illustrates a radial segment bearing having circularly-disposed arcuately shaped segment bearings 35 with radially disposed support members 36 which may be designed as set forth above.

It should now be apparent that an improved segment bearing has been disclosed which satisfies the objects and advantages set forth above. Moreover, it will also be apparent to those skilled in the art that numerous modifications, variations, substitutions and equivalents exist for the various features of the invention as defined by the appended claims. Accordingly, it is expressly intended that all such modifications, variations, substitutions and equivalents which fall within the spirit and scope of the invention as defined in the appended claims be embraced thereby.

What is claimed is:

1. A segment bearing of the type suitable for use in connection with a large rotatable shaft, the bearing including a segment comprising:
   an inclinable support member having a support area;
   a friction bearing member having bearing surface; and
   means including a plurality of support elements between the support member and the friction bearing member, the support elements being distributed on the support area, each support element being constructed to have a compressive strength selected such that deflections of the bearing surface are essentially uniform whereby deflection of the bearing surface occurs in such a manner that the deflected condition is parallel to the unstressed condition.

2. The segment bearing of claim 1 wherein the flexural strength of the support member exceeds the flexural strength of the bearing member by a factor of at least 10.

3. The segment bearing of claim 1 or 2 wherein both the support member and the bearing member have a uniform thickness.

4. The segment bearing of claim 3 wherein the support member has a thickness which exceeds the thickness of the bearing member by a factor of at least two.

5. The segment bearing of claim 1 wherein each support element comprises a circularly-cylindrical pin, the pins having uniform length but different diameters to attain predetermined compressive strengths.

6. The segment bearing of claim 1 wherein each support cylinder comprises a hollow cylinder, the cylinders having differing wall thicknesses to attain predetermined compressive strengths.

7. The segment bearing of claim 1 wherein each support element comprises a disc-cylinder.

8. The segment bearing of claim 1 wherein the support elements are fashioned from materials having different moduli of elasticity to attain predetermined compressive strengths.

9. The segment bearing claim 1 wherein the support member is eccentrically supported.

10. A segment bearing of the type suitable for use in connection with a large rotatable shaft, the bearing including a segment comprising:
an inclinable support member having a support area;
a friction bearing member having bearing surface;
a plurality of support elements between the support member and the friction bearing member, the support elements being distributed on the support area, each support element being constructed to have a compressive strength selected such that deflections of the bearing surface are essentially uniform whereby deflection of the bearing surface occurs in such a manner that the deflected condition is parallel to the unstressed condition; and
wherein each support element comprises a circularly-cylindrical pin, the pins having uniform diameters but differing axial lengths to attain predetermined commpressive strengths.

11. An axial thrust segment bearing of the type suitable for use in connection with axial support of a large rotatable shaft, the bearing including a segment comprising:
an inclinable support member having a support area;
a friction bearing member having a bearing surface; and a plurality of support elements between the support member and the friction bearing member, the support elements being generally parallel to the rotatable shaft and being distributed on the support area, each support element being constructed to have a compressive strength selected such that deflections of the bearing surface are essentially uniform so that as the bearing surface deflects under load, the deflected condition is parallel to the unstressed condition.

* * * * *